United States Patent
Törmä

[11] Patent Number: 6,144,660
[45] Date of Patent: Nov. 7, 2000

[54] CROSS CONNECTION ELEMENT AND DATA TRANSMISSION NETWORK

[75] Inventor: Esa Törmä, Helsinki, Finland

[73] Assignee: Nokia Networks Oy, Espoo, Finland

[21] Appl. No.: 09/470,171

[22] Filed: Dec. 22, 1999

Related U.S. Application Data

[63] Continuation of application No. PCT/FI98/00557, Jun. 25, 1998.

[30] Foreign Application Priority Data

Jun. 27, 1997 [FI] Finland .................................... 972788

[51] Int. Cl.[7] .................................................. H04L 12/52
[52] U.S. Cl. ............................ 370/380; 370/366; 370/368
[58] Field of Search .................................... 370/360, 380, 370/366, 368, 369, 328

[56] References Cited

FOREIGN PATENT DOCUMENTS

| 0 541 410 | 5/1993 | European Pat. Off. . |
| WO 94/00959 | 1/1994 | WIPO . |
| WO 94/28644 | 12/1994 | WIPO . |
| WO 98/28935 | 7/1998 | WIPO . |

OTHER PUBLICATIONS

Lee, et al., "Advances in Telecommunications Networks", Artech House, pp. 26–27, 1995.
Copy of International Search Report for PCT/FI98/00557.

*Primary Examiner*—Joseph L. Felber
*Attorney, Agent, or Firm*—Altera Law Group, LLC

[57] ABSTRACT

This invention relates to a cross connection element which comprises at least one input, output and branching means for forwarding through predetermined outputs at least some signal components of a first serial data signal received through the input. To provide such a cross connection element that considerably facilitates the management of the data transmission network, the branching means comprise means for transparently forwarding single signal components of a serial data signal received through said input, as serial data signals through the output indicated by the routing data stored in the memory means of the cross connection element. In addition, the cross connection element comprises at least one output for transparently forwarding a single signal component of a first serial data signal indicated by the routing data stored in the memory means.

9 Claims, 3 Drawing Sheets

CROSS CONNECTION ELEMENT AND DATA TRANSMISSION NETWORK

This application is a continuation of PCT/FI98/00557 filed Jun. 25, 1998.

FIELD OF THE INVENTION

The present invention relates to a cross connection element which comprises at least one input, outputs and branching means for forwarding through predetermined outputs at least some signal components of a first serial data signal received through the input. The invention further relates to a data transmission network of a telecommunication system, which network comprises network elements that communicate with one another with serial data transmission connections, the network elements comprising at least one input, branching means and outputs for forwarding to other network elements at least some signal components of the serial data signals, received through the input of the network elements.

DESCRIPTION OF RELATED ART

The present invention relates to a telecommunication system utilizing serial data transmission connections, and in particular, to couplings of its network elements. For instance, in mobile telephone systems the network elements are typically chained in such a way that only part of the data signal content transmitted to a given network element from other parts of the system is intended for the use of said network element's own devices. The rest of the data signal content transmitted to the network element is intended for network elements that locate further away in the chain. Since one network element is typically coupled to a plurality of other network elements, it has to be able to separate in the serial data signal received the data intended for it from the data to be forwarded, and in addition to that, to transmit the signals to be forwarded through correct data transmission connections.

In known telecommunication systems as described above, the network elements comprise demultiplexing means for disassembling the received serial data signal into single signal components. Correspondingly, the outputs of the network elements are provided with multiplexing means, whereby single signal components that are supplied to the outputs are assembled into a serial signal to be transmitted to the next network element. In order to transmit correct signal components further to a correct network element, the known network elements comprise a switching matrix consisting of cables, and consequently the correct signal components can be transferred from an input to a correct output by means of the cables. One known solution of this kind is illustrated in FIG. 1.

A serious drawback with the above-described solution is the complicity of cabling and inflexibility in connection with alterations to be effected in the network, i.e. for example, when a new network element is added to the network. Namely, to alter the switching matrix requires that an electrician visits the installation site of the network element and alters its cabling, i.e. physically changes the cable end from one connector to another. Since the number of cables is great, and since it is most likely that cables need to be shifted in a plurality of network elements, the risk of an error is great. To locate the committed error is difficult, since a new visit to the installation site of the network element is required, in order to find out how the cables are coupled in a specific network element.

Previously known are also cross connection elements in accordance with PDH (plesiochronous digital hierarchy). However, these known cross connection elements have a drawback that the signals they deal with have a nested structure in accordance with the multiplexing hierarchy required by the standard, and as a result the cross connection elements become complicated and expensive due to the PDH multiplexer stages required. Another serious drawback is that, in accordance with the PDH hierarchy, only signals of values 2, 8 and 34 M can be used, which considerably restricts the flexibility of cross connection in various implementations.

SUMMARY OF THE INVENTION

The object of the present invention is to solve the above-described problem and to provide a solution which considerably facilitates the management of the data transmission network. This is achieved with the cross connection element of the invention, which is characterized in that the branching means comprise means for forwarding single signal components of the serial data signal, received through said input, transparently as serial data signals via an output indicated by routing data stored in memory means of the cross connection element, and that the cross connection element comprises at least one output for forwarding transparently a single signal component of the first serial data signal indicated by the routing data stored in the memory means.

The invention further relates to a data transmission network in which the cross connection element of the invention can be utilized. The data transmission network of the invention is characterized in that it comprises at least one network element whose branching means include a cross connection element comprising means for transparently forwarding single signal components of a serial data signal, received through an input, as serial data signals via outputs, indicated by routing data stored in memory means of the cross connection element, to other network elements, and at least one output for forwarding a single signal component of the data signal received through said input transparently to the network element's own devices.

The invention is based on the idea that by utilizing a cross connection element which is capable of treating, i.e. forwarding, transparently via correct outputs single signal components of the serial data signal received, on the basis of the routing data stored in its memory, the on-site cabling of the cross connection element becomes considerably simpler, since the operation of the cross connection element is thus no longer dependent on the cable couplings, but on the routing data stored in the memory means. This also facilitates the reconfiguration of the network considerably, since in connection with the reconfiguration, it is sufficient to alter the routing data stored in the memory means, and there is no need to interfere with the on-site cabling. At best, the routing data stored in the memory means can be altered even by remote control from the network management centre, whereby the electrician's on-site visit becomes unnecessary in connection with the network reconfiguration. Since the cross connection element transparently forwards single signal components of the serial data signal received, i.e. it forwards them without interfering with the information content or structure of the signal components, the cross connection element is made very simple in structure and low in price, in addition to which it is applicable to the transmission of a variety of signals. By arranging at least three serial ports in the cross connection element, it is ensured that, by means of it, branching points are provided in a very simple manner in the telecommunication network.

The use of the cross connection element of the invention does not necessitate the use of any standard signal. However, signals Si (e.g. S1, S2 and S3) to be cross connected must contain a sufficient number of mutually similar signals P1-n with equal bit rates, which signals can thus be cross connected with the cross connection element. Each signal Si may contain a varying number of said signals Pj. The signals Pj are completely independent of one another, and they need not comply with any particular standard, even though in practical implementations, it may be most advantageous to use standard data communication signals, such as 2MIE1 or 1.5M/T1.

In the solution of the invention, standard multiplexing hierarchy need not be used, but a varying number of similar, e.g. 2M signals, can be combined directly in the signal Si frame into the signal Si. Said signal thus constitutes the signal n×2M, where n may be, for instance, between 1 and 16. This lowers the cost of implementation substantially, as compared with the standard signals (E2, E3, . . . ) (since the standard multiplexing hierarchy need not be used), whereby in practice the cross connection elements can be utilized, for instance, for connecting adjacent devices, without the cost being an obstacle to that.

Hence, the most considerable advantages of the cross connection element and the data transmission network are the simple structure and price; on-site cabling is considerably facilitated, maintenance personnel need to visit the site less frequently, since possible alterations can be carried out by remote control; a possibility of errors diminishes and error locating is facilitated, since the connections of the cross connection element can be found out, for instance, by means of a database maintained at the network management centre, whereby the connection bookkeeping is no longer dependent on notes (how the cabling of said cross connection element is coupled) taken manually on site; the size of the cross connection element is considerably reduced, since the number of cable connections needed considerably decreases; and the cross connection element of the invention enables rerouting of single signal components in the desired manner, whereby the use of the cross connection element is very flexible, since all the intermediate capacity is available (e.g. 1 to 16×2M).

BRIEF DESCRIPTION OF THE DRAWINGS

In the following, the invention will be described by way of example in greater detail with reference to the attached drawings, in which.

DETAILED DESCRIPTION OF THE INVENTION

Figure 1:
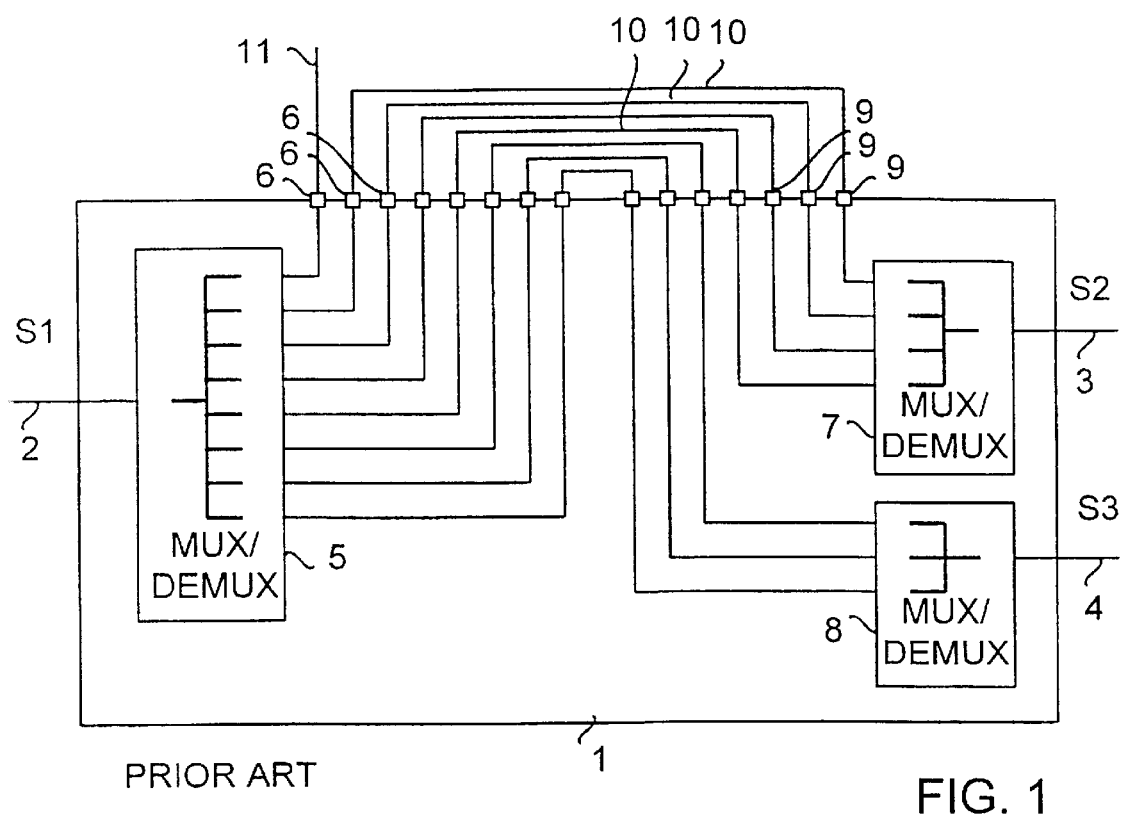
FIG. 1 illustrates a cross connection unit of a prior art network element.

FIG. 1 illustrates a cross connection element 1 of a prior art network element. The cross connection unit 1 of FIG. 1 may be arranged, for instance, in connection with a base station of a cellular radio system so that it communicates with a mobile services switching centre by means of a data transmission connection 2. Correspondingly, the cross connection unit may communicate, for instance, with two other base stations by means of data transmission connections 3 and 4. In FIG. 1, data transmission is bidirectional, i.e. the cross connection unit 1 transmits telecommunication signals both from the data transmission connection 2 to the data transmission connections 3 and 4, and vice versa, i.e. from the connections 3 and 4 to the connection 2. However, in the following, only the transmission of telecommunication signals from the connection 2 to the connections 3 and 4 will be described by way of example.

In FIG. 1, it is supposed that the cross connection device 1 receives serial data signals S1 from the data transmission connection 2, which may comprise e.g. a coaxial cable, a radio link or the like. Said signals propagate to a multiplexer/demultiplexer unit 5 where the single signal components of the signal S1 are separated from one another, i.e. the frame used in the data transmission connection 2 is disassembled. The single signal components are assumed to be, for instance, 2 Mbit/s signals in accordance with the CCITT recommendations G.704. Hence, the serial data signal S1, which consists of eight 2 Mbit/s signals, is transmitted in both transmission directions in the data transmission connection 2.

The signals from the output of the multiplexer/demultiplexer unit 5 are conveyed by cables (in general, coaxial cables or twin cables) to connectors 6, which are eight in number in FIG. 1, arranged in the side of the cross connection device 1 casing. In known solutions, the cross connection device is not necessarily separately encased, but its parts may be placed in appropriate points within said network element. Thus the connectors may be attached to the network element casing.

Like in connection with the data transmission connection 2, the corresponding multiplexer/demultiplexer units 7 and 8 are also arranged in connection with the data transmission connections 3 and 4 in FIG. 1. The inputs of these units are coupled to the connectors 9, which are seven in number in FIG. 1, in the side of the cross connection device casing.

FIG. 1 shows that the operation of the cross connection device 1 thus depends on how the connectors 6 and 9 are interconnected, i.e. in practice, external cables 10 between these connectors determine in which transmission direction the cross connection device 1 forwards a single signal component of the serial data signal S1. In FIG. 1, the serial data signal S2, consisting of four signal components (i.e. 4×2Mbit/s) included in the signal S1, is transmitted to the connection 3 and the serial data signal S3, consisting of three signal components (i.e. 3×2Mbit/s) included in the signal S1 is transmitted to the connection 4. In FIG. 1, the last, i.e. the eighth signal component included in the signal S1, remains at the disposal of the network element to which the cross connection device 1 is installed. In other words, if the network element concerned is a base station, the communications of said base station are conducted by means of a cable 11, and consequently, the highest possible data transmission capacity available to the base station is 2 Mbit/s (in both transmission directions).

The fact that the operation of the cross connection device 1 depends on the couplings of the cables 10 between the connectors 6 and 9 means that it is very difficult to carry out possible alterations, since it requires an on-site visit by the electrician to change the couplings of the cables 10. Moreover, it is very likely that errors occur, since the number of the cables 10 may be considerably higher than that presented in FIG. 1.

Figure 2:
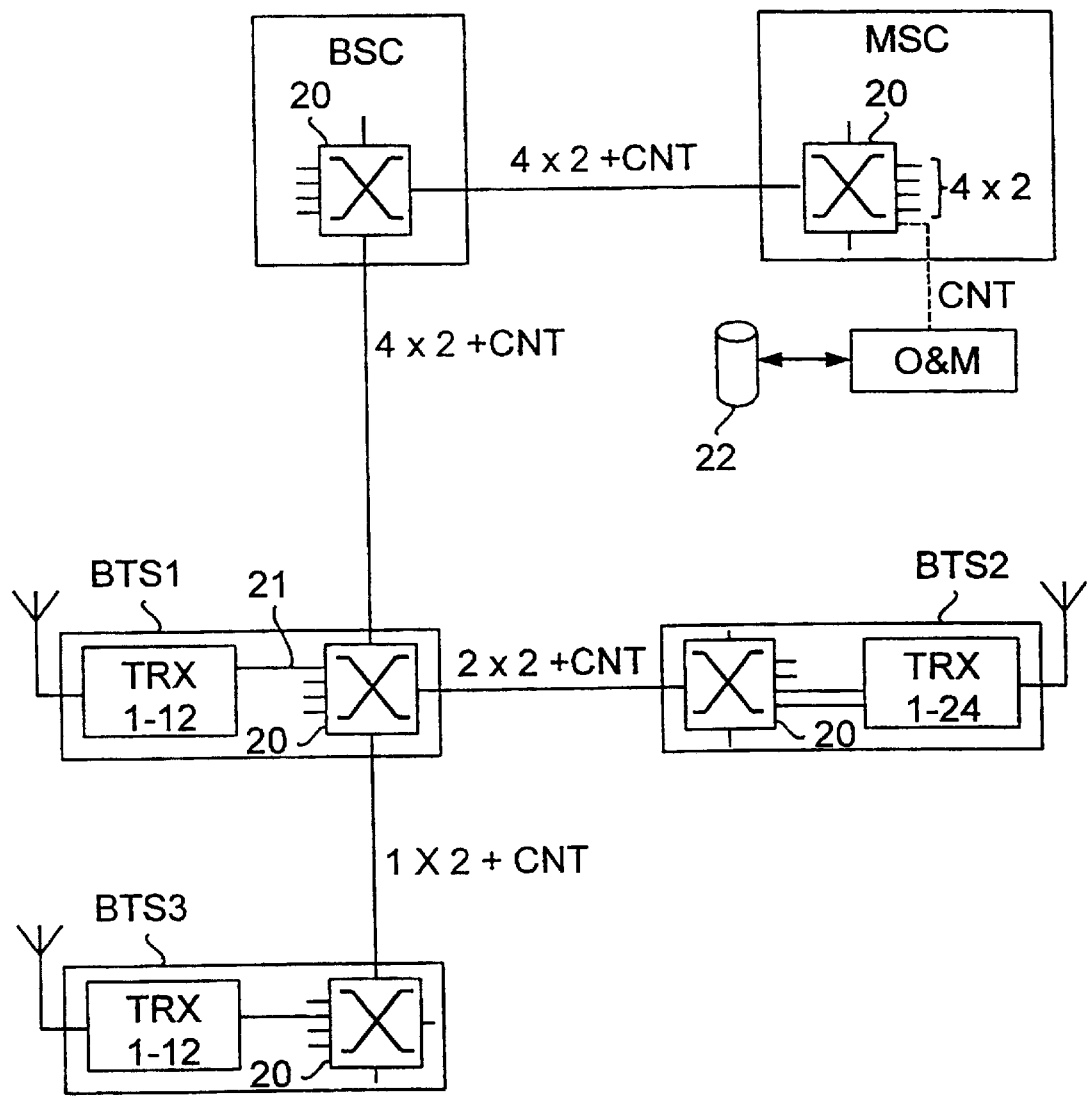
FIG. 2 is a block diagram of a first preferred embodiment of a data transmission network in accordance with the invention.

FIG. 2 is a block diagram of a first preferred embodiment of the data transmission network of the invention. By way of example, the data transmission network of FIG. 2 is assumed to be a data transmission network of the GSM (Global System for Mobile communications) cellular radio system, by which data transmission signals are transmitted between a mobile services switching centre MSC, a base station controller BSC and base stations BTS1 to BTS3. In FIG. 2, all the network elements MSC, BSC and BTS1 to BTS3 are integrated with cross connection elements 20 of the invention, through which the entire data transmission between the network elements is conveyed. Even though FIG. 2 shows only one cross connection element per network element, it is naturally possible to arrange a plurality of cross connection elements in a single network element, for instance, if more transmission capacity (more 2 Mbit/s interfaces) is needed in said network element than what can be achieved with one cross connection element. The data transmission connections between the network elements can be implemented in any known manner, for instance, by coaxial cables, optical fibre cables, radio links or combinations thereof.

FIG. 2 shows that the cross connection element 20 of the mobile services switching centre has four interfaces, through each one of which 2 Mbit/s channels in accordance with the CCITT recommendations G.704 can be transmitted in both directions. In addition to this, the cross connection element of the mobile services switching centre MSC has an interface to the network management centre O&M of the system for a control channel CNT which controls the cross connection elements 20. By means of a serial data transmission connection between the mobile services switching centre MSC and the base station controller BSC four 2 Mbit/s channels are thus transmitted in both directions, and additionally, the control channel CNT, which may be e.g. 64 kbit/s, is also transmitted. It is to be noted in this connection that the number of channels to be transmitted may vary from the four mentioned above by way of example. For instance, sixteen 2 Mbit/s channels can be transmitted quite as well from the mobile service switching centre further to the base station controller. Thus, said sixteen channels, the above-mentioned control channel and other signalling and/or control channels that are possibly needed, can be inserted into a transfer frame which is transmitted on serial data communication connections whose capacity is e.g. 37 Mbit/s. Hence, all the serial connections between the cross connection elements 20 in FIG. 2 may be this kind of 37 Mbit/s connections, of the capacity of which only the necessary part is utilized.

The control channel CNT may be, for instance, a connection of the point-to-point type, which the interconnected cross connection elements 20 use alternately, as needed. Alternatively, the control channel CNT may be of the point-to-multipoint type, and consequently the control channel is branched in the cross connection elements to other cross connection elements.

In the example, the cross connection element 20 of the base station controller BSC is programmed to forward the 2 Mbit/s signals received from the mobile services switching centre MSC via the base station controller BSC to the cross connection element 20 of the base station BTS1 as a serial data signal which comprises 4×2 Mbit/s+CNT. In FIG. 2, the cross connection element of the base station BTS1 is programmed to transmit to its own devices, such as transceivers TRX 1 to 12, one of the 2 Mbit/s channels received via the interface 21, in addition to which it forwards 2×2 Mbit/s+ CNT to the base station BTS2 and 1×2 Mbit/s+CNT to the base station BTS3.

The cross connection element of the base station BTS3 does not communicate with other network elements than the base station BTS1. Consequently, it does not forward the received channel, but transmits it in whole for the use of its own devices. Correspondingly, the devices of the base station BTS2 use in whole the two 2 Mbit/s channels transmitted to said base station.

Since the cross connection elements 20 are programmable, the operator may change the network configuration from the network management centre O&M, for instance, if it is found that the base station BTS3 needs more data transmission capacity while the base station BTS2 has excessive data transmission capacity. Thus, from the network management centre O&M, the operator may reprogram the cross connection element 20 of the base station BTS1 by means of the control channel CNT to the effect that thereafter it transmits two 2 Mbit/s channels to the base station BTS3, and correspondingly, only one to the base station BTS2. At the same time, new routing data of the cross connection element 20 can be stored in the database 22 of the network management centre O&M, where the network configuration can be found out at any time. Correspondingly, if a base station is desired to be added to the mobile telephone system of FIG. 2, it may be effected so that the cross connection element of said new base station is connected to either one of the free serial ports of the cross connection element 20 of the base station BTS2, for instance, whereafter the operator may reprogram the cross connection element of the base station BTS2 from the network management centre O&M to the effect that thereafter it transmits one 2 Mbit/s channel to the new base station. As appears from the above description, routing data of the cross connection elements can be programmed with an accuracy of single signal components, i.e. in the example, with an accuracy of one 2 Mbit/s channel.

In the case of FIG. 2, the operator may also transmit a control request from the network management centre O&M to the cross connection elements 20 of the system, for instance, if the database 22 is not updated. The cross connection elements 20 that received the control request then send a message to the network management centre by means of the control channel CNT, from which message appears the routing data stored at that moment in the memory of the cross connection elements. Among other things, this facilitates fault localization in case of interference.

In the case of FIG. 2, the cross connection elements can be programmed locally, i.e. the maintenance man may connect a programming terminal, e.g. a portable computer or the like, to the cross connection element, and consequently he may alter the routing data stored in the memory of the cross connection element by means of the programming terminal. The cross connection element may thus be arranged to transmit a message automatically, after the programming is finished, to the network management centre, from which message appears the new routing data of said cross connection element.

Figure 3:
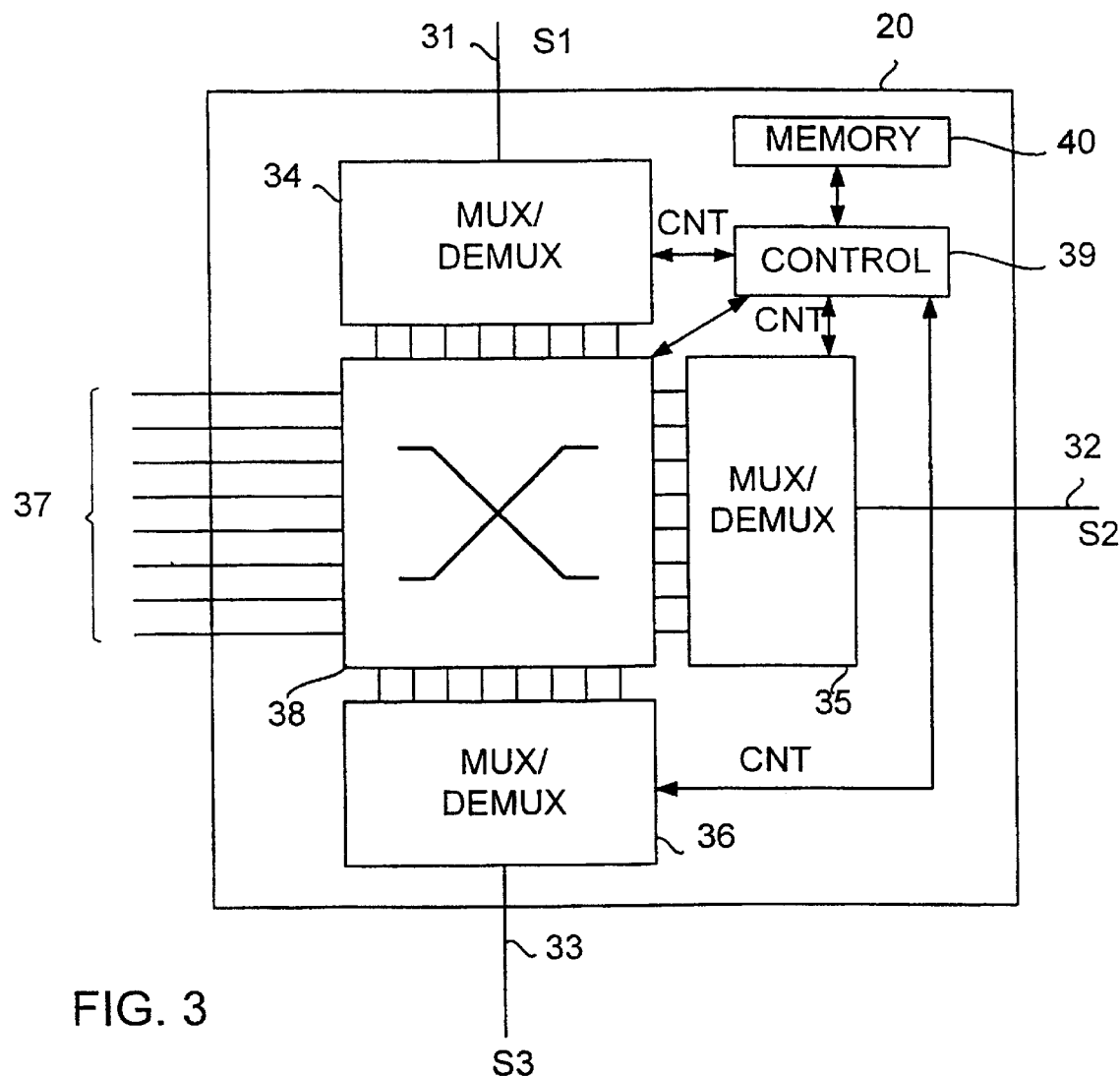
FIG. 3 is a block diagram of a first preferred embodiment of a cross connection element in accordance with the invention.

FIG. 3 is a block diagram of a first preferred embodiment of the cross connection element of the invention. The cross connection element of FIG. 3 may be integrated into one single circuit, e.g. an ASIC (Application Specific Integrated Circuit) circuit. Consequently, its structure is very compact. In other respects, the cross connection element of FIG. 3 corresponds to the cross connection elements of FIG. 2, but instead of four interfaces, the cross connection element of FIG. 3 comprises eight interfaces 37.

In accordance with the invention, the cross connection element comprises at least three serial ports 31 to 33, whereby it is very simple to branch the network by interconnecting cross connection circuits by means of these serial ports. A multiplexer/demultiplexer circuit 34 to 36 is arranged in connection with each serial port, by means of which circuits, in the receiving direction, the transfer frames of the serial data signals S1 to S3 are disassembled so that single signal components, such as 2 Mbit/s channels in accordance with the CCITT recommendations G.704, can be separated from one another. Correspondingly, in the transmitting direction, the signal components to be transmitted are inserted into the transfer frames of the serial data transmission connections. In addition, the multiplexer/demultiplexer circuits 34 to 36 have buffers which together with the fill bits of the signals S1 to S3 compensate the timing differences of different connections.

Moreover, the cross connection element comprises a plurality of interfaces 37 through which a single signal component of the serial data signal S1, S2 or S3 received from any connection can be transmitted to the use of said network element. Hence, for instance, one 2 Mbit/s channel can be transmitted through each one of the interfaces 37 in both transmission directions.

The cross connection element 20 further comprises a switching field 38 controlled by a control unit 39 on the basis of the routing data stored in its memory 40. Hence the single signal components are directed transparently through the switching field 38 between the serial ports 31 to 33 and the interfaces 37, on the basis of the routing data stored in the memory 40.

By means of the serial ports 31 to 33 the control unit 39 of the cross connection element 20 receives data transmitted on the control channel CNT by other similar cross connection elements. This kind of data may include, for instance, new routing data for the cross connection element 20 of FIG. 3, whereby the control unit 39 stores said new routing data in the memory 40 to replace the previous data. Thereafter, the control unit 39 controls the switching field 38 on the basis of the new routing data.

It is to be understood that the above specification and the figures related thereto are only intended to illustrate the present invention. Thus the present invention can also be applied to other systems, even though in the above, the invention is described, by way of example, particularly with reference to a cellular radio system. Thus it is obvious to the person skilled in the art that the invention may be varied and modified in a variety of ways without deviating from the scope and spirit of the invention disclosed in the appended claims.

What is claimed is:

1. A cross connection element which comprises at least one input, outputs and branching means for forwarding through predetermined outputs at least some signal components of a first serial data signal received through the input, wherein the branching means comprise means for forwarding single signal components of the first serial data signal, received through said input, transparently as secondary serial data signals via an output indicated by routing data stored in memory means of the cross connection element, and the cross connection element comprises at least one output for forwarding transparently a single signal component of the first serial data signal indicated by the routing data stored in the memory means.

2. A cross connection element as claimed in claim 1, comprising demultiplexing means for separating from one another the signal components of the first serial data signal received through said input, switching means, responsive to the memory means, for supplying the signal components received from the outputs of the demultiplexing means to the outputs indicated by the routing data stored in the memory means, and multiplexing means, arranged in connection with at least two outputs, for producing said secondary serial data signals of the signal components received from the switching means and for forwarding said secondary serial data signals through said at least two outputs.

3. A cross connection element as claimed in claim 1, wherein the cross connection element comprises means for separating a predetermined control signal from the first serial data signal received through said input, and means for storing routing data included in said control signal in the memory means to replace the previous routing data.

4. A cross connection element as claimed in claim 1, wherein said at least one output for forwarding the single component of the received first serial data signal is a 2 Mbit/s output in accordance with the CCITT recommendations G.703.

5. A cross connection element as claimed in claim 1, wherein the cross connection element consists of one single circuit.

6. A data transmission network of a telecommunication system, which network comprises network elements that communicate with one another with serial data transmission connections, the network elements comprising at least one input, branching means and outputs for forwarding to other network elements at least some signal components of serial data signals, received through the input of the network elements, said network comprising at least one network element whose branching means include a cross connection element comprising means for transparently forwarding single signal components of a first serial data signal, received through an input, as secondary serial data signals via outputs indicated by routing data stored in memory means of the cross connection element, to other network elements, and at least one output for forwarding a single signal component of the first data signal received through said input transparently to devices of said at least one network element.

7. A data transmission network as claimed in claim 6, wherein that the data transmission network comprises means for transmitting a control signal containing new routing data, from a network management center to the cross connection elements of the network elements, by means of said serial data transmission connections, and that the cross connection element of said at least one network element comprises means for separating the control signal from the received first serial data signal and for storing the new routing data contained in the control signal in the memory means of the cross connection element to replace the previous routing data.

8. A data transmission network as claimed in claim 6, wherein said data transmission network is the data transmission network of a cellular radio system, and that said network elements consist of network elements, including mobile services switching centers, base station controllers and base stations, of the cellular radio system.

9. A data transmission network as claimed in claim 6, wherein the cross connection element of said at least one network element comprises means for transmitting a control signal indicating the routing data stored in the memory means of the cross connection element, by means of said serial data transmission connections, to a network management center of the data transmission network.

* * * * *